US006970634B2

(12) United States Patent
McCann et al.

(10) Patent No.: US 6,970,634 B2
(45) Date of Patent: Nov. 29, 2005

(54) FIBER OPTIC WAFER PROBE

(75) Inventors: Peter R. McCann, Beaverton, OR (US); John T. Martin, Portland, OR (US)

(73) Assignee: Cascade Microtech, Inc., Beaverton, OR (US)

( * ) Notice: Subject to any disclaimer, the term of this patent is extended or adjusted under 35 U.S.C. 154(b) by 0 days.

(21) Appl. No.: 09/849,152

(22) Filed: May 4, 2001

(65) Prior Publication Data

US 2002/0164145 A1 Nov. 7, 2002

(51) Int. Cl.7 .................................................. G02B 6/00

(52) U.S. Cl. .................. 385/139; 385/117; 356/241.1; 607/93

(58) Field of Search ............................ 385/139, 76, 84, 385/85, 88, 90, 83, 78, 65, 95, 115, 117, 11, 385/12; 607/93; 356/241.1

(56) References Cited

U.S. PATENT DOCUMENTS

| | | | | |
|---|---|---|---|---|
| 4,652,082 A | | 3/1987 | Warner | 385/83 |
| 4,696,544 A | | 9/1987 | Costella | |
| 4,788,851 A | | 12/1988 | Brault | 73/49.2 |
| 4,818,059 A | | 4/1989 | Kakii et al. | 350/96.21 |
| 4,970,386 A | | 11/1990 | Buck | 250/227.24 |
| 4,972,073 A | | 11/1990 | Lessing | 250/227.16 |
| 5,101,453 A | * | 3/1992 | Rumbaugh | 385/12 |
| 5,317,656 A | | 5/1994 | Moslehi et al. | 385/12 |
| 5,430,813 A | | 7/1995 | Anderson et al. | 385/12 |
| 5,621,400 A | | 4/1997 | Corbi | 340/962 |
| 5,728,091 A | | 3/1998 | Payne et al. | 606/15 |
| 5,803,607 A | | 9/1998 | Jones et al. | 374/161 |
| 5,879,289 A | * | 3/1999 | Yarush et al. | 600/179 |
| 6,006,002 A | | 12/1999 | Motoki et al. | |
| 6,071,009 A | | 6/2000 | Clyne | 374/137 |
| 6,222,970 B1 | * | 4/2001 | Wach et al. | 385/115 |
| 6,572,608 B1 | * | 6/2003 | Lee et al. | 606/15 |

FOREIGN PATENT DOCUMENTS

| | | |
|---|---|---|
| DE | 195 42 955 C2 | 11/1995 |
| DE | 197 49 687 A1 | 11/1997 |
| EP | 0846476 | 6/1998 |
| JP | 6154238 | 6/1994 |
| JP | 09127432 | 5/1997 |
| WO | PCT/EP93/02774 | 10/1993 |

OTHER PUBLICATIONS

Search Report from the German Patent Office, German Utility Model Application No. 202 20 754.4, Aug. 19, 2004.

* cited by examiner

*Primary Examiner*—Leonidas Boutsikaris
(74) *Attorney, Agent, or Firm*—Chernoff, Vilhauer, McClung & Stenzel

(57) ABSTRACT

A fiber optic wafer probe that includes a fiber optic cable for approaching a device under test.

73 Claims, 6 Drawing Sheets

FIBER OPTIC WAFER PROBE

BACKGROUND OF THE INVENTION

The present invention relates to fiber optic probes for use in making on-wafer measurements of the parameters of photodetectors and other optoelectronic devices.

An existing fiber optic probe for use in making measurements is shown in Modolo et al., "Wafer Level High-Frequency Measurements of Photodetector Characteristics," Applied Optics, volume 27, pages 3059–3061 (1988). In the Modolo et al. probe, an optical fiber is pressure fitted into the grooved periphery of a disc segment mounted on a probe arm so that the fiber extends longitudinally through a bend of 90 degrees around the disc segment and thence to a pulsed optical signal source. To probe a given device, the probing end of the optical fiber is advanced longitudinally toward the surface of the test device until it is approximately 100 micrometers from the surface of the device.

One of the limitations of the Modolo et al. probe is that the optical fiber is pressure fitted into the peripheral groove of the disc segment and therefore cannot move longitudinally relative to the disc segment. Thus, as the probing end of the optical fiber is moved longitudinally toward the surface of the test device, any slight over travel of movement will cause the end of the fiber to impact against the surface causing possible damage either to the surface of the test device or to the end of the fiber, or both.

Rubmaugh, U.S. Pat. No. 5,101,453, discloses a fiber optic wafer probe that includes a probe body along which an optical fiber extends to protrude from the tip of the probe body. The probe body loosely guides the optical fiber so that at least a significant portion of the length of the optical fiber is movable longitudinally with respect to the tip and probe body. The purpose of the movability of the optical fiber is to enable the optical fiber to buckle longitudinally in response to longitudinal over-travel of the fiber toward the test device. After repeated use, the optical fiber is replaced by a new optical fiber and connector. Unfortunately, replacement of the optical fiber insert is both expensive and time consuming. Further, the angle of incidence provided by the optical probe may be unsuitable for a particular probe station or probing requirements. Moreover, the bulky nature of the optical probe make it unsuitable for environments with limited available space.

Clyne, U.S. Pat. No. 6,071,009, discloses a tubular arrangement with a fiber optic lead contained therein specifically designed for measuring the surface temperature of wire-bonded semiconductors and the like. A temperature sensor is attached to the end of the fiber optic lead to facilitate temperature measurements. However, the design disclosed by Clyne is specifically designed for surface temperature measurements and is generally ineffective for optical probing of semiconductor wafers.

DETAILED DESCRIPTION OF THE PREFERRED EMBODIMENT

Figure 1:
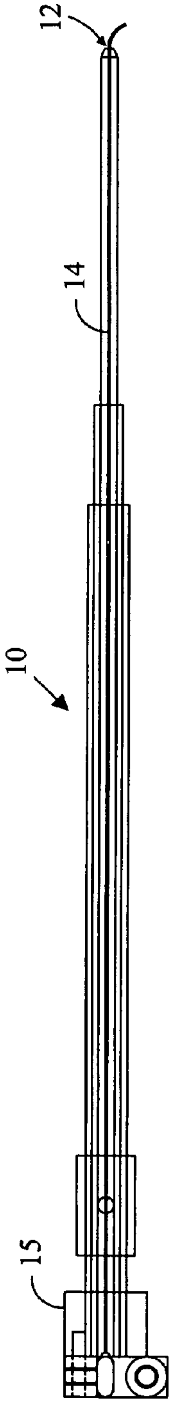
FIG. 1 is side view of an exemplary embodiment of a fibre optic probe.

The present inventors considered existing fiber optic probe wafer probes and determined that their design limits the existing probe's ability to accurately test a semiconductor wafer. Referring to FIG. 1, the preferred embodiment of a fiber optic probe of the present invention comprises a probe body, indicated generally as 10. The probe body 10 has a probe tip 12 at one end and an optical fiber support 15 at the other end. The probe body 10 is preferably generally tubular with an optical fiber 14 extending through and out the end of the probe tip 12. It is to be understood that the tubular cross sectional profile may be any shape, as desired. The tubular probe body 10 is preferably circular which facilitates a decreased profile so that the probe body 10 may be more readily used with probe stations that have limited space for accessing the device under test. The probe body 10 preferably has a substantially uniform vertical cross sectional height along a major length of the probe body 10, especially the end proximate the probe tip 12. Likewise, the probe body 10 preferably has a substantially uniform horizontal cross sectional width along a major length of the probe body 10, especially proximate probe tip 12. Other cross sectional profiles for the probe body 10 may likewise be used, as desired.

The cavity defined within the probe body 10 along a substantial or major portion of its length is preferably closely surrounding the optical fiber 14 maintained therein. With the optical fiber 14 maintained in such a close relationship to the cavity, a major portion of (or substantially all of) the optical fiber 14 is effectively restrained from free lateral movement along the length of the probe body 10 during testing (or otherwise), in the event of contact with the optical probe and the device under test. Further, by resisting free movement of the optical fiber during testing the end of the optical fiber may be maintained in at a more predetermined location to optimize optical coupling and increases the placement accuracy of the end of the optical fiber during testing.

After further consideration of the internal profile of the probe body 10 the present inventors determined that a tapered profile toward the probe tip 12 permits the optical fiber to be more easily inserted within the probe body 10. While the region proximate the probe tip 12 may provide the primary resistance to free lateral movement of the optic fiber, a major portion of the remaining portion of the probe body 10 maintains the optical fiber relatively stationary, which may improve measurements made with the fibre optic probe. Preferably, the cross sectional area near the tip is less than the cross sectional area near the middle, which is likewise less than the cross sectional area near the end proximate the support 15.

In order to achieve improved usability for the fibre optic probe to be used in a multitude of different environments, the probe body 10 is preferably readily bendable to adjust the angle of the probe tip with respect to the probe body. In this manner, the angle of incidence of the optical fibre may be selected and otherwise adjusted to achieve increased performance.

Figure 2A:
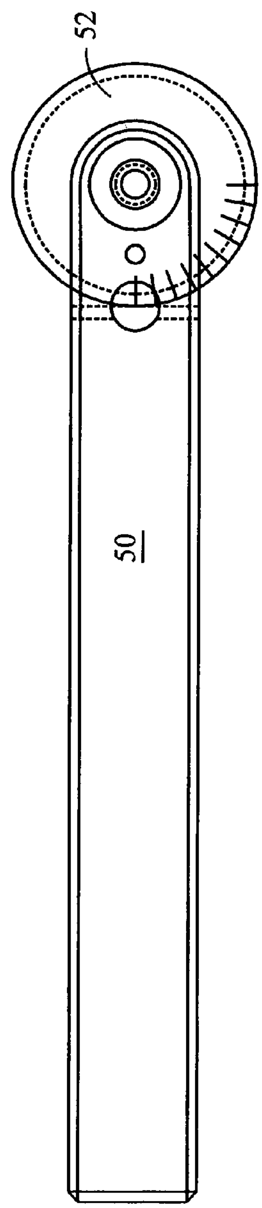
FIG. 2A is a side view of a probe bending tool.
Figure 2B:
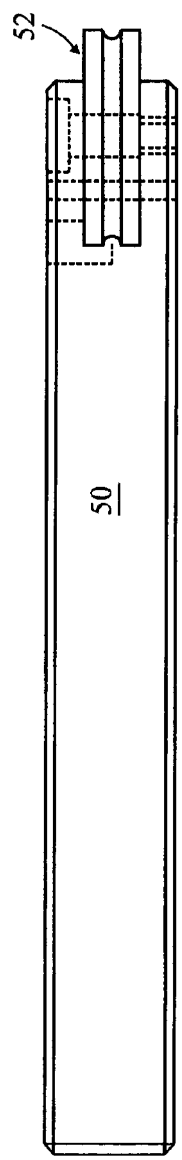
FIG. 2B is a top view of the probe bending tool of FIG. 2A.
Figure 3:
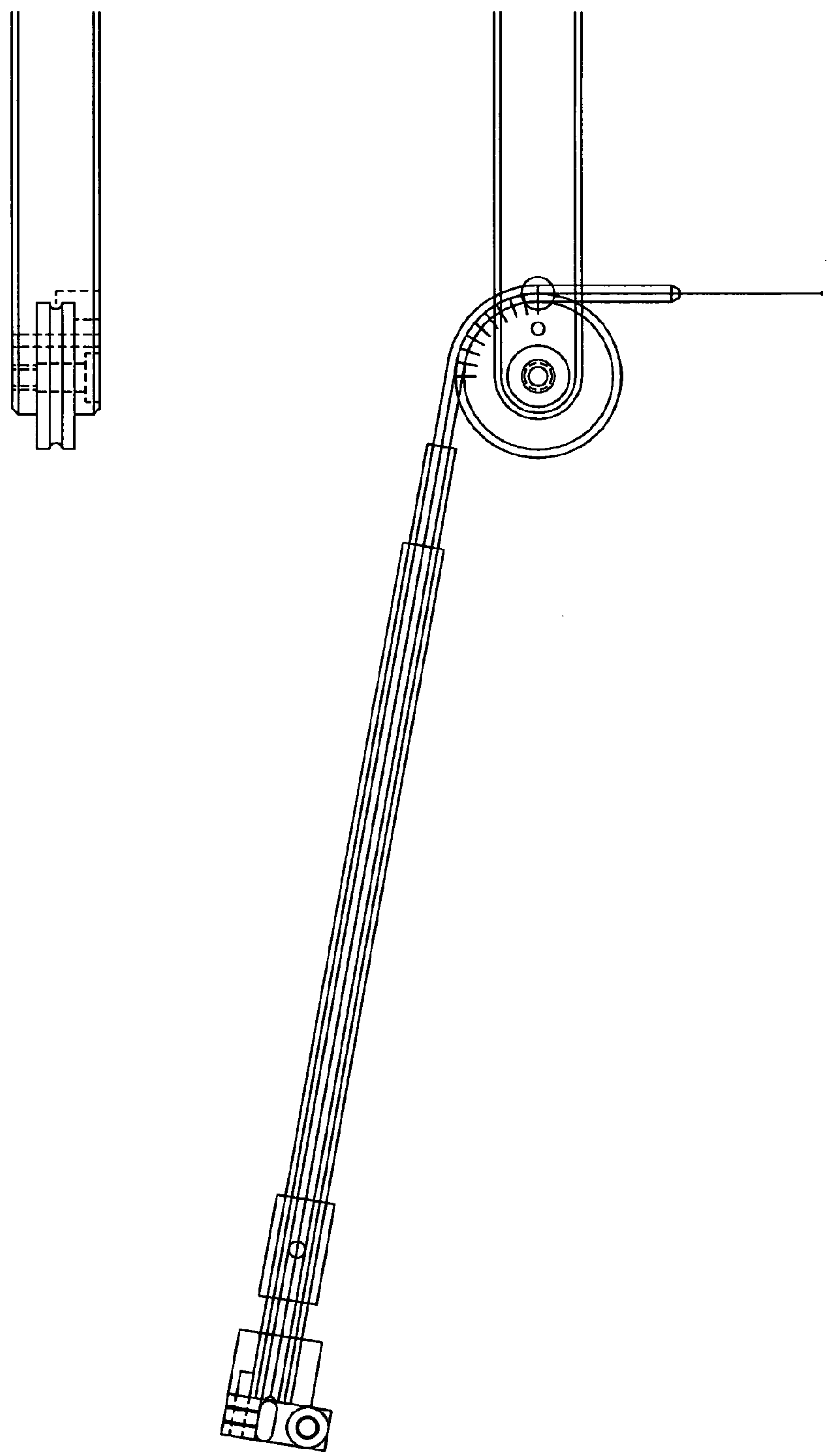
FIG. 3 is a side view of the probe being bent by the bending tool.
Figure 4A:
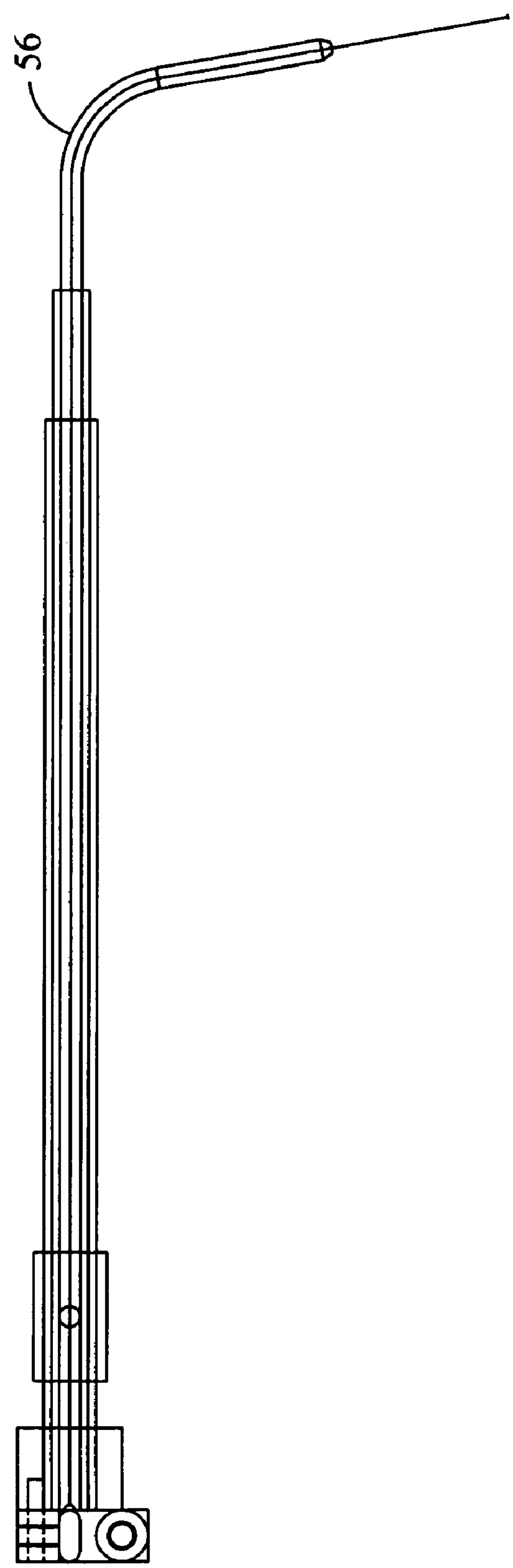
FIG. 4A is a side view of the resulting bent probe.

To bend the probe body 10, preferably with the optical fibre contained therein, a bending tool may be used, as shown in FIGS. 2A and 2B. The bending tool includes a handle 50 and a grooved circular member 52 maintained in a stationary position relative to the handle 50. The distal portion of the probe body 10 is inserted between the handle 50 and the grooved circular member 52, as shown by FIG. 3, and gently bent into the desired angle. Referring to FIG. 4A, the resulting probe body 10 will maintain the curved portion.

The preferred material from which the exterior of the probe body 10 is constructed of is a flexible metallic or conductive material. After consideration of the properties of a metallic material the present inventors determined that the metallic material has a tendency to "kink" or otherwise crimp the optical fiber contained therein when bent. In order to reduce the likelihood of damaging the optical fibre, while maintaining the relatively close relationship between the tubular cavity and the optical fiber, the present inventors determined that an internal capillary material constructed from any suitable material may be used. Within the probe body the capillary material preferably closely surrounds the optical fiber, as previously described. The capillary material preferably extends from the probe tip through a significant or major portion of the probe body 10, such as past the anticipated bent portion 56. The capillary material is selected from any suitable material such that it has a lesser tendency to crimp or otherwise deform than the external material, such as metal. Preferably, the range of bending is up to 90°, but may be from 10°–60°, if desired. It is to be understood that the optical fibre does not necessarily need to be maintained within an elongate cavity. It is sufficient, that the optical fibre extends longitudinally along a portion of the probe body.

Figure 6:
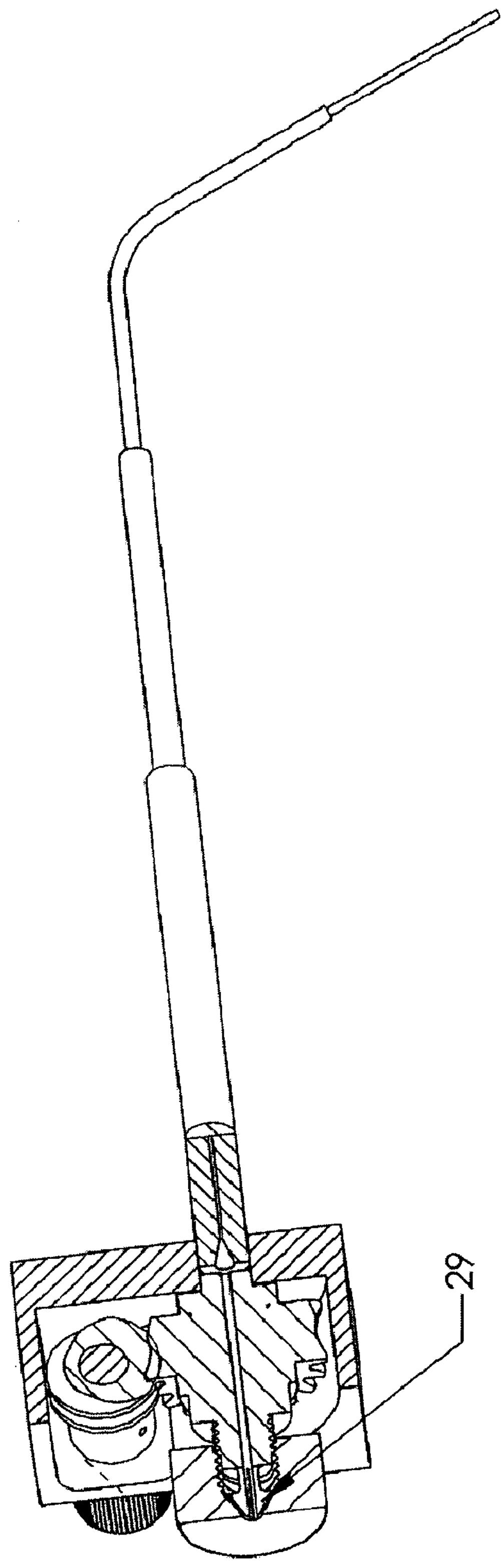
FIG. 6 is an exemplary collet that may be used with the fibre optic probe.

The optical fiber 14 may be connected to a conventional optical fiber connector at one end, such as that disclosed by Rumbaugh, U.S. Pat. No. 5,101,453. Unfortunately, the connection of the combination of an optical fiber 14 and the connector results in significant expense over the life of the product to periodically replace the optical fibre. In addition, after initially adjusting the length of the optical fibre, it is difficult to trim the end of the optical fiber again to remove a damaged portion at the end thereof Moreover, the connector maintains the optical fiber in a fixed rotational position which may result in twisting the optical fiber during use thus increasing the likelihood of breaking the optical fiber. To overcome these limitations, the present inventors have determined that extending the optical fibre through a support 15 to a light signal source 60 is preferable. The support 15 preferably rotatably secures the optical fiber 14 to maintain the terminal portion of the optical fiber at the proper position. The support 15 may include a collet 29 (see FIG. 6), or other fiber optical securement structure. The collet 29 preferably supports a major portion of the circumference of the optical fiber 14 so that pressure is distributed thereon to reduce the likelihood of damage to the optical fiber 14. With a selectively detachable securement structure, the support 14 may release the optical fibre 14 and the length of the optical fiber 14 may be adjusted or the optical fiber may be free to rotate, or otherwise maintained free from a rigid theta orientation. Adjustment of the length of the optical fiber 14 is preferably performed by moving it longitudinally with respect to the probe body. This permits adjustment of the length of the optical fiber 14 which is more convenient than moving the support 14 for the probe body. After adjusting the length of the optical fiber 14, the end of the optical fiber 14 extending beyond the probe tip 12 may be cut or otherwise trimmed, as desired. This permits removal of a damaged portion of the optical fiber 14 without having to replace an entire portion of the optical fiber 14 for the wafer probe. With the securement structure released, the optical fiber 14 may be free to rotate, permitting the optical fiber 14 to be readily untwisted.

The collet 29 or other fiber securement structure may also be rotatable within the support 14, or otherwise replace the support 14, to permit a controlled rotation of the optical fiber 14 about its longitudinal axis. This theta adjustment permits rotational adjustment of the end of the optical fiber 14 with respect to the wafer without releasing the securement structure which may result in improved testing, especially if the end of the optical fiber 14 is cut at a non-perpendicular orientation with respect to the length of the fiber. In the preferred embodiment, gear teeth around the perimeter of the collet 29 mesh with a helical thread on an adjustment knob.

Figure 4B:
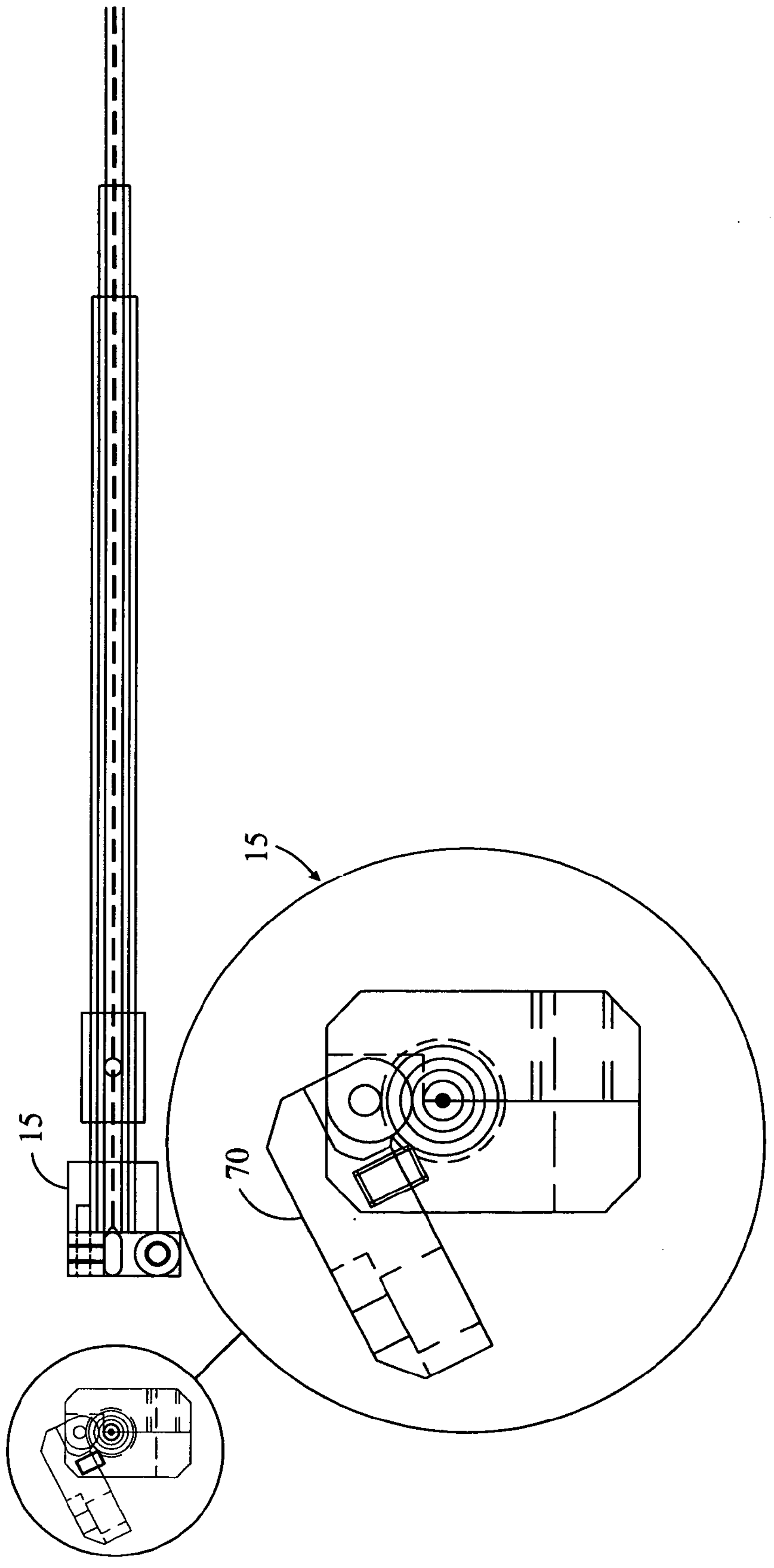
FIG. 4B is a side view of the probe including a detailed view of a support for the probe.
Figure 5:
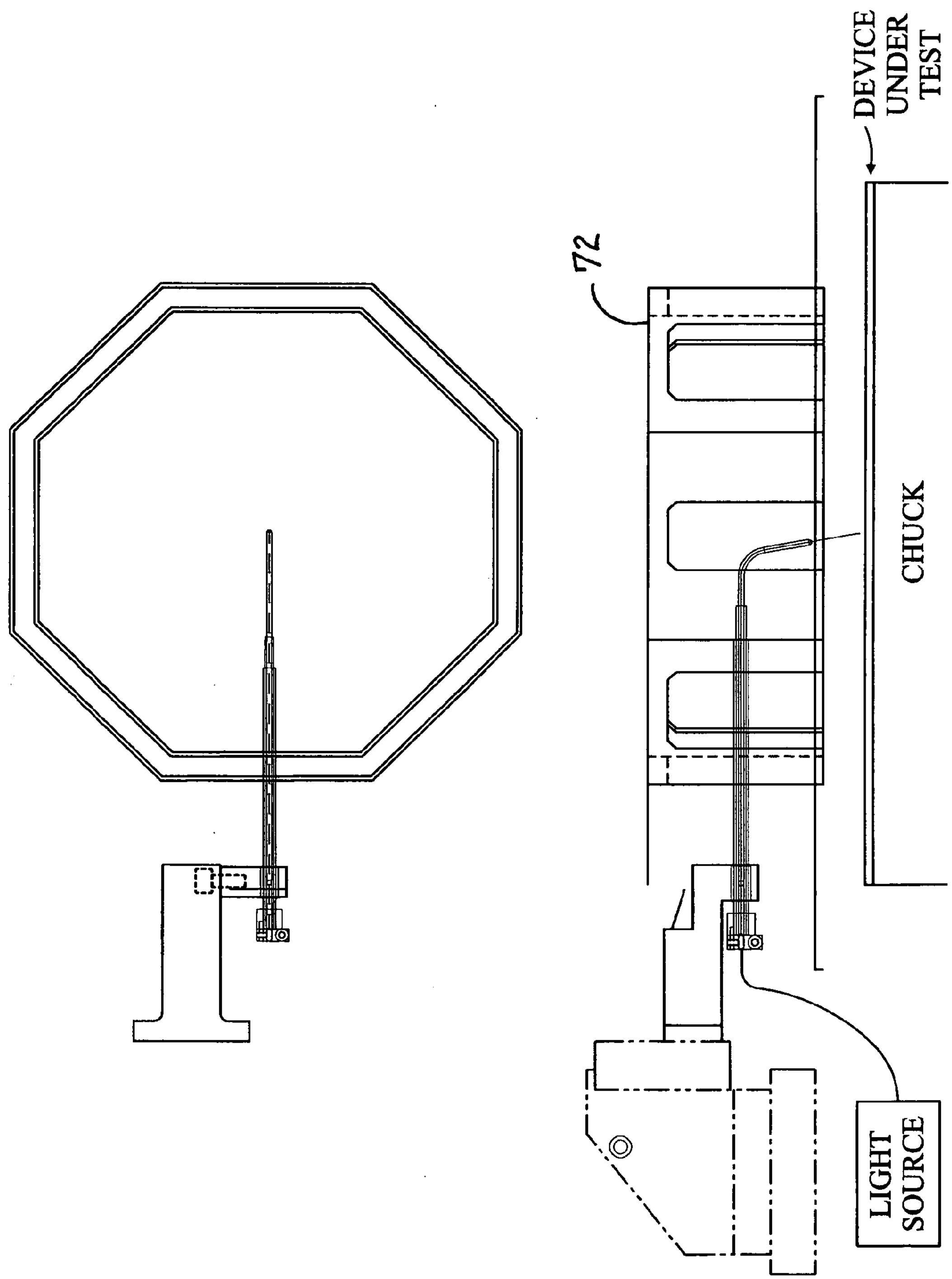
FIG. 5 is the probe proving a device under test.

Referring to FIG. 4B, the preferred support 15 is illustrated together with a hinged releasing mechanism 70. The support 15 provides the aforementioned features, as previously mentioned. It is to be understood that the support may be designed in any fashion, as desired. Referring to FIG. 5, the fiber optical wafer probe may be used for testing a device under test. The preferred embodiment is particularly suitable for testing a device under test when the probe station includes a top hat 72, which limits the available space of the probe body 12.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fiber optic probe comprising:

(a) a probe body having a tip for selectively approaching a device under test;

(b) an elongate optical fiber extending longitudinally along said body and extending beyond said tip; and (c) said probe body being sized such that at least a major portion of said elongate optical fiber is maintained free from freely moving with respect to said probe body, (d) said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material.

2. The optic probe of claim 1 further comprising said probe body defining a first terminal portion proximate said tip having a first cross sectional area, a second terminal portion proximate the opposing end of said probe body from said tip having a second cross sectional area, and an intermediate portion located generally half way between said first terminal portion and said second terminal portion having a third cross sectional area, wherein said first cross sectional area is less than said second cross sectional area, and said third cross sectional area is less than said second cross sectional area.

3. The optic probe of claim 1 further comprising said elongate optical fiber longitudinally adjustable with respect to said body.

4. A fiber optic probe comprising:

(a) a probe body having a tip for selectively approaching a device under test;

(b) an elongate optical fiber extending longitudinally along said body and extending beyond said tip; and (c) said probe body being sized such that at least a major portion of said elongate optical fiber is maintained free from freely moving with respect to said probe body;

(d) said fiber optic probe including a support for selectively maintaining said optical fiber from freely moving longitudinally with respect to said probe body.

5. The optic probe of claim 1 further comprising a substantial portion of said probe body being readily bendable to adjust the angle of said probe tip with respect to the probe body.

6. The optic probe of claim 1 further comprising said probe body being sized such that substantially all of said elongate optical fiber is maintained free from freely moving with respect to said probe body.

7. The optic probe of claim 1 further comprising a major portion of said probe body having a substantially constant vertical profile.

8. The optic probe of claim 1 further comprising said probe body defining a cavity therein through which said elongate fiber extends, wherein a major portion of said cavity closely surrounds said elongate optical fiber.

9. A fiber optic probe comprising:

(a) a probe body having a tip for selectively approaching a device under test;

(b) an elongate optical fiber extending longitudinally along said body and extending beyond said tip; and (c) said probe body defining a first terminal portion proximate said tip having a first cross sectional area immediately surrounding said optical fiber, a second terminal portion proximate the opposing end of said probe body from said tip having a second cross sectional area immediately surrounding said optical fiber, and an intermediate portion located generally half way between said first terminal portion and said second terminal portion having a third cross sectional area immediately surrounding said optical fiber, wherein said first cross sectional area is less than said second cross sectional area, and said third cross sectional area is less than said second cross sectional area;

(d) said fiber optic probe including a support for selectively maintaining said optical fiber from freely moving longitudinally with respect to said probe body.

10. The optic probe of claim 9 further comprising said probe body being sized such that at least a major portion of said elongate optical fiber is maintained free from freely moving with respect to said probe body.

11. A fiber optic probe comprising:

(a) a probe body having a tip for selectively approaching a device under test:

(b) an elongate optical fiber extending longitudinally along said body and extending beyond said tip; and (c) said probe body defining a first terminal portion proximate said tip having a first cross sectional area immediately surrounding said optical fiber, a second terminal portion proximate the opposing end of said probe body from said tip having a second cross sectional area immediately surrounding said optical fiber, and an intermediate portion located generally halfway between said first terminal portion and said second terminal portion having a third cross sectional area immediately surrounding said optical fiber, wherein said first cross sectional area is less than said third cross sectional area, and said third cross sectional area is less than said second cross sectional area:

(d) said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material.

12. The optic probe of claim 9 further comprising said elongate optical fiber longitudinally adjustable with respect to said body.

13. The optic probe of claim 9 further comprising a substantial portion of said probe body being readily bendable to adjust the angle of said probe tip with respect to the probe body.

14. The optic probe of claim 9 further comprising said probe body being sized such that substantially all of said elongate optical fiber is maintained free from freely moving with respect to said probe body.

15. The optic probe of claim 9 further comprising a major portion of said probe body having a substantially constant vertical profile.

16. The optic probe of claim 9 further comprising said probe body defining a cavity therein through which said elongate fiber extends, wherein a major portion of said cavity closely surrounds said elongate optical fiber.

17. A fiber optic probe comprising:

(a) a probe body having a tip for selectively approaching a device under test;

(b) an elongate optical fiber extending longitudinally along said body and extending beyond said tip; and (c) said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material, wherein said optical fiber is movable with respect to said inner layer when engaging said optical fiber with said probe body.

18. The optic probe of claim 17 further comprising said probe body being sized such that at least a major portion of said elongate optical fiber is maintained free from freely moving with respect to said probe body.

19. The optic probe of claim 17 further comprising said probe body defining a first terminal portion proximate said tip having a first cross sectional area, a second terminal portion proximate the opposing end of said probe body from said tip having a second cross sectional area, and an intermediate portion located generally half way between said first terminal portion and said second terminal position having a third cross sectional area, wherein said first cross sectional area is less than said second cross sectional area, and said third cross sectional area is less than said second cross sectional area.

20. The optic probe of claim 17 further comprising said elongate optical fiber longitudinally adjustable with respect to said body.

21. The optic probe of claim 17 further comprising said fiber optic probe including a support for selectively maintaining said optical fiber from freely moving longitudinally with respect to said probe body.

22. The optic probe of claim 17 further comprising a substantial portion of said probe body being readily bendable to adjust the angle of said probe tip with respect to the probe body.

23. The optic probe of claim 17 further comprising said probe body being sized such that substantially all of said elongate optical fiber is maintained free from freely moving with respect to said probe body.

24. The optic probe of claim 17 further comprising a major portion of said probe body having a substantially constant vertical profile.

25. The optic probe of claim 17 further comprising said probe body defining a cavity therein through which said elongate fiber extends, wherein a major portion of said cavity closely surrounds said elongate optical fiber.

26. A fiber optic probe comprising:

(a) a probe body having a tip for selectively approaching a device under test;

(b) an elongate optical fiber extending longitudinally along said body and extending beyond said tip; and (c) said elongate optical fiber longitudinally adjustable with respect to said body such that the length of said optical fiber extending beyond said tip is extendable without removing said optical fiber from said probe body, wherein the length of said elongate optical fiber extending longitudinally along said body and beyond said tip is modified when said optical fiber is longitudinally adjustable;

(d) said fiber optic probe including a support for selectively maintaining said optical fiber from freely moving longitudinally with respect to said probe body.

27. The optic probe of claim 26 further comprising said probe body being sized such that at least a major portion of said elongate optical fiber is maintained free from freely moving with respect to said probe body.

28. The optic probe of claim 26 further comprising said probe body defining a first terminal portion proximate said tip having a first cross sectional area, a second terminal portion proximate the opposing end of said probe body from said tip having a second cross sectional area, and an intermediate portion located generally half way between said first terminal portion and said second terminal portion having a third cross sectional area, wherein said first cross sectional area is less than said second cross sectional area, and said third cross sectional area is less than said second cross sectional area.

29. The optic probe of claim 26 further comprising said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material.

30. The optic probe of claim 26 further comprising a substantial portion of said probe body being readily bendable to adjust the angle of said probe tip with respect to the probe body.

31. The optic probe of claim 26 further comprising said probe body being sized such that substantially all of said elongate optical fiber is maintained free from freely moving with respect to said probe body.

32. The optic probe of claim 26 further comprising a major portion of said probe body having a substantially constant vertical profile.

33. The optic probe of claim 26 further comprising said probe body defining a cavity therein through which said elongate fiber extends, wherein a major portion of said cavity closely surrounds said elongate optical fiber.

34. A fiber optic probe comprising:

(a) a probe body having a tip for selectively approaching a device under test;

(b) an elongate optical fiber extending longitudinally along said body and extending beyond said tip; and (c) said fiber optic probe including a support supporting a major portion of the circumference of said optical fiber for selectively maintaining said optical fiber from freely moving longitudinally with respect to said probe body.

35. The optic probe of claim 34 further comprising said probe body being sized such that at least a major portion of said elongate optical fiber is maintained free from freely moving with respect to said probe body.

36. The optic probe of claim 34 further comprising said probe body defining a first terminal portion proximate said tip having a first cross sectional area, a second terminal portion proximate the opposing end of said probe body from said tip having a second cross sectional area, and an intermediate portion located generally half way between said first terminal portion and said second terminal portion having a third cross sectional area, wherein said first cross sectional area is less than said second cross sectional area, and said third cross sectional area is less than said second cross sectional area.

37. The optic probe of claim 34 further comprising said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material.

38. The optic probe of claim 34 further comprising said elongate optical fiber longitudinally adjustable with respect to said body.

39. The optic probe of claim 34 further comprising a substantial portion of said probe body being readily bendable to adjust the angle of said probe tip with respect to the probe body.

40. The optic probe of claim 34 further comprising said probe body being sized such substantially all of said elongate optical fiber is maintained free from freely moving with respect to said probe body.

41. The optic probe of claim 34 further comprising a major portion of said probe body having a substantially constant vertical profile.

42. The optic probe of claim 34 further comprising said probe body defining a cavity therein through which said elongate fiber extends, wherein a major portion of said cavity closely surrounds said elongate optical fiber.

43. A fiber optic probe comprising:

(a) a probe body having a tip for selectively approaching a device under test;

(b) an elongate optical fiber extending longitudinally along said body and extending beyond said tip; and (c) a substantial portion of said probe body being readily bendable to adjust the angle of said probe tip with respect to the probe body and said optical fiber slidable engageable with said substantial portion of said probe body;

(d) said fiber optic probe including a support for selectively maintaining said optical fiber from freely moving longitudinally with respect to said probe body.

44. The optic probe of claim 43 further comprising said probe body being sized such that at least a major portion of said elongate optical fiber is maintained free from freely moving with respect to said probe body.

45. The optic probe of claim 43 further comprising said probe body defining a first terminal portion proximate said tip having a first cross sectional area, a second terminal portion proximate the opposing end of said probe body from said tip having a second cross sectional area, and an intermediate portion located generally half way between said first terminal portion and said second terminal portion having a third cross sectional area, wherein said first cross sectional area is less than said second cross sectional area, and said third cross sectional area is less than said second cross sectional area.

46. The optic probe of claim 43 further comprising said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material.

47. The optic probe of claim 43 further comprising said elongate optical fiber longitudinally adjustable with respect to said body.

48. The optic probe of claim 43 further comprising said probe body being sized such that substantially all of said elongate optical fiber is maintained free from freely moving with respect to said probe body.

49. The optic probe of claim 43 further comprising a major portion of said probe body having a substantially constant vertical profile.

50. The optic probe of claim 43 further comprising said probe body defining a cavity therein through which said elongate fiber extends, wherein a major portion of said cavity closely surrounds said elongate optical fiber.

51. A fiber optic probe comprising:

(a) a probe body having a tip for selectively approaching a device under test;

(b) an elongate optical fiber extending longitudinally along said body and extending beyond said tip; and (c) a major portion of said probe body having a substantially constant vertical profile;

(d) said fiber optic probe including a support for selectively maintaining said optical fiber from freely moving longitudinally with respect to said probe body.

52. The optic probe of claim 51 further comprising said probe body being sized such that at least a major portion of said elongate optical fiber is maintained free from freely moving with respect to said probe body.

53. The optic probe of claim 51 further comprising said probe body defining a first terminal portion proximate said tip having a first cross sectional area, a second terminal portion proximate the opposing end of said probe body from said tip having a second cross sectional area, and an intermediate portion located generally half way between said first terminal portion and said second terminal portion having a third cross sectional area, wherein said first cross sectional area is less than said second cross sectional area, and said third cross sectional area is less than said second cross sectional area.

54. The optic probe of claim 51 further comprising said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material.

55. The optic probe of claim 51 further comprising said elongate optical fiber longitudinally adjustable with respect to said body.

56. The optic probe of claim 51 further comprising a substantial portion of said probe body being readily bendable to adjust the angle of said probe tip with respect to the probe body.

57. The optic probe of claim 51 further comprising said probe body being sized such substantially all of said elongate optical fiber is maintained free from freely moving with respect to said probe body.

58. The optic probe of claim 51 further comprising said probe body defining a cavity therein through which said elongate fiber extends, wherein a major portion of said cavity closely surrounds said elongate optical fiber.

59. A fiber optic probe comprising:

(a) a probe body having a tip for selectively approaching a device under test;

(b) an elongate optical fiber extending longitudinally along said body and extending beyond said tip; and (c) said probe body defining a cavity therein through which said elongate fiber extends, wherein a major portion of said cavity closely surrounds said elongate optical fiber around the entire periphery of said fiber;

(d) said fiber optic probe including a support for selectively maintaining said optical fiber from freely moving longitudinally with respect to said probe body.

60. The optic probe of claim 59 further comprising said probe body being sized such that at least a major portion of said elongate optical fiber is maintained free from freely moving with respect to said probe body.

61. The optic probe of claim 59 further comprising said probe body defining a first terminal portion proximate said tip having a first cross sectional area, a second terminal portion proximate the opposing end of said probe body from said tip having a second cross sectional area, and an intermediate portion located generally half way between said first terminal portion and said second terminal portion having a third cross sectional area, wherein said first cross sectional area is less than said second cross sectional area, and said third cross sectional area is less than said second cross sectional area.

62. The optic probe of claim 59 further comprising said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material.

63. The optic probe of claim 59 further comprising said elongate optical fiber longitudinally adjustable with respect to said body.

64. The optic probe of claim 59 further comprising a substantial portion of said probe body being readily bendable to adjust the angle of said probe tip with respect to the probe body.

65. The optic probe of claim 59 further comprising said probe body being sized such substantially all of said elongate optical fiber is maintained free from freely moving with respect to said probe body.

66. The optic probe of claim 59 further comprising a major portion of said probe body having a substantially constant vertical profile.

67. The optic probe of claim 1 further comprising a structure that permits selective rotation of at least a portion of said optical fiber with respect to said probe body.

68. The optic probe of claim 9 further comprising a structure that permits selective rotation of at least a portion of said optical fiber with respect to said probe body.

69. The optic probe of claim 17 further comprising a structure that permits selective rotation of at least a portion of said optical fiber with respect to said probe body.

70. The optic probe of claim 26 further comprising a structure that permits selective rotation of at least a portion of said optical fiber with respect to said probe body.

71. The optic probe of claim 34 further comprising a structure that permits selective rotation of at least a portion of said optical fiber with respect to said probe body.

72. The optic probe of claim 43 further comprising a structure that permits selective rotation of at least a portion of said optical fiber with respect to said probe body.

73. The optic probe of claim 59 further comprising a structure that permits selective rotation of at least a portion of said optical fiber with respect to said probe body.

* * * * *

UNITED STATES PATENT AND TRADEMARK OFFICE

CERTIFICATE OF CORRECTION

PATENT NO. : 6,970,634 B2
DATED : November 29, 2005
INVENTOR(S) : Peter R. McCann et al.

It is certified that error appears in the above-identified patent and that said Letters Patent is hereby corrected as shown below:

Column 3,
Line 40, change "end thereof Moreover" to -- end thereof. Moreover --.

Column 5,
Line 39, change "said second" to -- said third --.

Column 9,
Lines 48-49, change "a major portion of said probe body having a substantially constant vertical profile" to -- substantially all of said probe having a substantially constant vertical profile --.

Signed and Sealed this

Ninth Day of May, 2006

JON W. DUDAS
*Director of the United States Patent and Trademark Office*